(12) United States Patent
Reuter et al.

(10) Patent No.: US 8,020,950 B2
(45) Date of Patent: Sep. 20, 2011

(54) SWITCHING CABINET ARRANGEMENT WITH A MAIN DOOR AND AT LEAST ONE AUXILIARY DOOR

(75) Inventors: Wolfgang Reuter, Liebenscheid (DE); Matthias Müller, Dillenburg (DE); Thomas Reichenbach, Haiger (DE)

(73) Assignee: Rittal GmbH & Co. KG, Herborn (DE)

( * ) Notice: Subject to any disclaimer, the term of this patent is extended or adjusted under 35 U.S.C. 154(b) by 303 days.

(21) Appl. No.: 12/290,228

(22) Filed: Oct. 28, 2008

(65) Prior Publication Data
US 2009/0127991 A1    May 21, 2009

(30) Foreign Application Priority Data
Oct. 29, 2007   (DE) .......................... 10 2007 051 511

(51) Int. Cl.
*E05C 7/06*    (2006.01)
(52) U.S. Cl. ...................... 312/220; 312/218; 312/107.5
(58) Field of Classification Search ............... 312/107.5, 312/216–217, 220, 222, 109, 324, 265.1–265.4; 49/395, 506, 15–17, 19–20; 292/137, 156–157, 292/163, 171, 175, 138, 141, 145, DIG. 21; 70/78–84, DIG. 16, DIG. 19, DIG. 64, DIG. 65; 109/53, 56, 67
See application file for complete search history.

(56) References Cited

U.S. PATENT DOCUMENTS

| | | | | |
|---|---|---|---|---|
| 1,614,336 | A * | 1/1927 | Youngblood | 49/17 |
| 1,910,550 | A * | 5/1933 | Kaser | 292/33 |
| 2,259,722 | A * | 10/1941 | Bales | 312/109 |
| 2,417,167 | A * | 3/1947 | Johnston | 49/16 |
| 2,543,643 | A * | 2/1951 | Ryan et al. | 312/218 |
| 2,648,032 | A * | 8/1953 | Mekelburg | 312/107.5 |
| 2,887,735 | A * | 5/1959 | Coffey | 49/366 |
| 4,982,528 | A * | 1/1991 | Michel | 49/16 |
| 5,641,215 | A * | 6/1997 | Pochet | 312/109 |
| 6,047,501 | A * | 4/2000 | Zeitler | 49/506 |
| 6,088,219 | A * | 7/2000 | Yanniello et al. | 312/223.1 |
| 6,637,842 | B2 * | 10/2003 | Elm et al. | 312/217 |
| 7,558,052 | B1 * | 7/2009 | Coomer et al. | 361/608 |

OTHER PUBLICATIONS

Rittal TS "Door Interlock for Isolators", Assembly instructions, 04-10, (4 pages).

* cited by examiner

*Primary Examiner* — Hanh V Tran
(74) *Attorney, Agent, or Firm* — Pauley Petersen & Erickson

(57) ABSTRACT

A switching cabinet arrangement equipped with a main door and at least one auxiliary door having a locking device mounted on them, which has an actuating mechanism that causes an actuating device to unlock the auxiliary door as the main door is opened. The locking device has a blocking mechanism that acts on the actuating device and prevents the main door from closing when an auxiliary door is open.

30 Claims, 10 Drawing Sheets

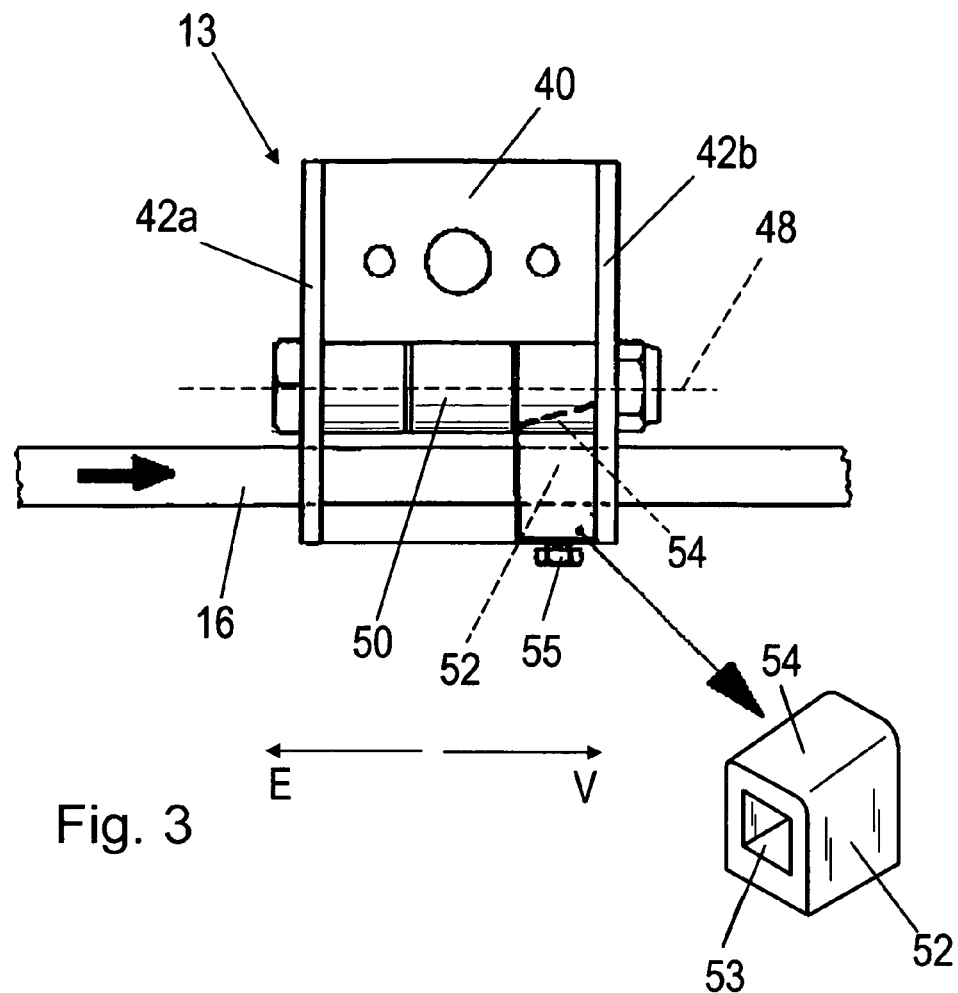
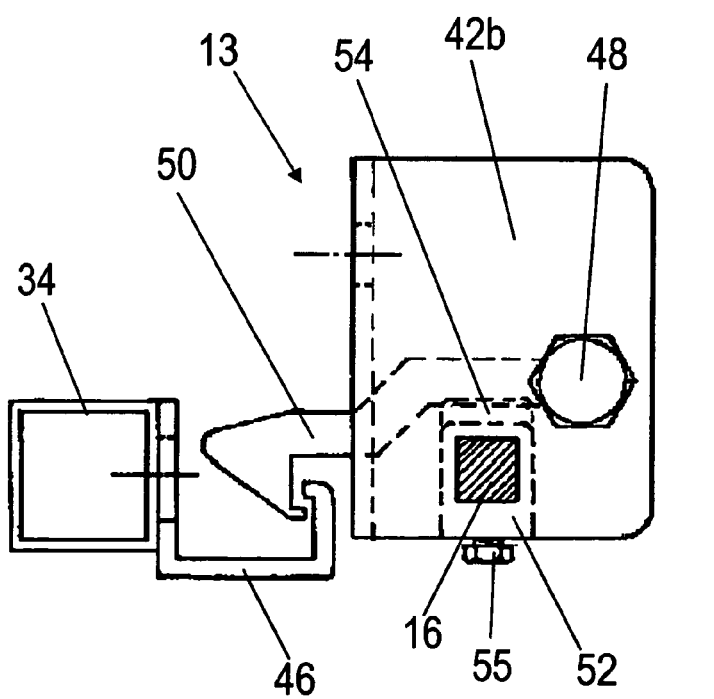
Fig. 3
Fig. 4

SWITCHING CABINET ARRANGEMENT WITH A MAIN DOOR AND AT LEAST ONE AUXILIARY DOOR

BACKGROUND OF THE INVENTION

1. Field of the Invention

This invention relates to a switching cabinet arrangement with a main door and at least one auxiliary door, which have a locking device mounted on them and which has an actuating mechanism that causes an actuating device to unlock the auxiliary door when the main door is opened.

2. Discussion of Related Art

A switching cabinet arrangement is known from the assembly instructions entitled "Rittal PS/TS Circuit Breaker Locking." In this known switching cabinet arrangement, the auxiliary doors only open if the main door is unlocked and opened. After actuation of a main switch provided on the front side of the switching cabinet arrangement, it is thus possible to electrically switch off the power supply for the switching cabinet arrangement and at the same time, to unlock the main door. It is then possible to open the door lock of the main door by actuating the door handle of the main door.

With the opening motion, the actuating mechanism unlocks each auxiliary door by an arrangement of connecting rods functioning as an actuating device so that by actuating the respective door handles of the auxiliary doors, the respectively associated door lock and thus the respective auxiliary door can be opened.

In the known switching cabinet arrangement, it is only possible to switch on the power supply with the main switch if the main door is closed and at the same time, the locking device is in the locked position. However, in the existing switching cabinet arrangement, nothing assures that the auxiliary doors are actually closed in this state. Instead, with the known switching cabinet arrangement, it is not possible to prevent the main switch from inadvertently being actuating despite the auxiliary doors being open.

SUMMARY OF THE INVENTION

One object of this invention is to provide a known switching cabinet arrangement with a simple structure that prevents the main door from being closed, which would permit the main switch to be actuated, whenever one or more auxiliary doors remain open.

The above object of this invention is attained with a switching cabinet arrangement having characteristics defined in this specification and in the claims related to the switching cabinet arrangement according to this invention.

Correspondingly, the locking device cooperates with a blocking mechanism, which acts on the actuating device and prevents the main door from closing when an auxiliary door is open. Thus, with a simple measure, the main switch is reliably prevented from being inadvertently actuated.

According to a preferred embodiment of this invention the actuating mechanism can have a connecting rod arrangement. The connecting rod arrangement is horizontally guided on the side of the switching cabinet oriented toward the door, preferably in the region of the covering frame of the upper horizontal frame profile, and extends from the main door to the auxiliary door.

The connecting rod arrangement can be slid in the unlocking direction as the main door is opened and can be slid in the locking direction as the main door is closed. In this case, the connecting rod arrangement can be of a single continuous connecting rod or of several connecting rod elements arranged in sequence.

According to one embodiment, an elongated blocking element can be situated on the upper horizontal frame profile of the switching cabinet, in the region of the at least one auxiliary door and above the horizontally guided connecting rod arrangement, and is supported so that it can pivot around a horizontal pivot axis extending parallel to the connecting rod arrangement. When the auxiliary door is open, the force of gravity or the force of a spring orients the blocking element so that it is spaced a slight distance apart from the connecting rod arrangement. On the connecting rod arrangement, spaced a slight distance apart from the blocking element, a stop element has a vertical flank oriented toward the elongated blocking element. When the connecting rod arrangement is slid toward the elongated blocking element or more precisely, in the locking direction, the stop element strikes against the blocking element thus effectively preventing the connecting rod arrangement from sliding farther when the auxiliary door is open.

Alternatively, the force of gravity or the force of a spring can cause the blocking element to contact the connecting rod arrangement. In another embodiment, the stop element can be situated on the connecting rod arrangement, directly next to the elongated blocking element, thus completely preventing the connecting rod arrangement from sliding toward the elongated blocking element or more precisely, in the locking direction.

In order to actuate the blocking element as a function of the position of the auxiliary door, an actuating extension can be on the inside surface of the auxiliary door, protruding into the interior of the switching cabinet perpendicular to the inside surface of the door.

When the auxiliary door is closed, this actuating extension pushes the elongated blocking element out of its gravity-induced or spring-force induced aligned position into a pivoted position. In this pivoted position, the blocking element assumes a position spaced apart from the connecting rod arrangement by a distance that is greater than the height of the vertical flank of the stop element. Thus, when the auxiliary door is closed, the connecting rod arrangement is able to slide in the locking direction so that when the auxiliary doors are closed, it is also possible to lock the main door.

When the auxiliary door is open, the actuating extension can be retracted in the opening direction of the auxiliary door so that the force of gravity or the force of a spring moves the elongated blocking element back into the aligned position, thus completely preventing the connecting rod arrangement from sliding toward the elongated blocking element or more precisely, in the locking direction.

According to a particularly simple embodiment, the actuating extension can be formed as an essentially L-shaped angled element which can be attached with one leg to the inside surface of the door and which protrudes with its other leg in the direction perpendicular to the inside surface of the door.

In a particularly stable embodiment, the actuating extension can be mounted on the tubular door frame extending around the inside surface of the door.

In yet another embodiment, a spring element can prestress the connecting rod arrangement in an unlocking direction in relation to the body of the switching cabinet. In this case, an actuating part attached to the inside of the main door pushes the connecting rod arrangement in the locking direction in opposition to the spring force of the spring element as the main door is closed.

As the main door is opened, the actuating part releases the spring element so that the spring force of the spring element slides the connecting rod arrangement in the unlocking direction. As a result, the spring force of the spring element unlocks the auxiliary doors.

The connecting rod arrangement can be guided inside the switching cabinet arrangement in guide elements attached to the upper horizontal frame profile of the switching cabinet.

In this case, the guide elements can be simply embodied in the form of L-shaped or U-shaped angled profiles that are attached to the upper horizontal frame profile of the switching cabinet. Guide openings for accommodating the connecting rod arrangement lead into the legs that protrude perpendicular to the upper horizontal frame profile. The connecting rod arrangement, which can have a rectangular, preferably square cross section, can be guided in these guide openings. The guide openings have rectangular or square cross sections corresponding to those of the guide elements in order to prevent a rotation of the connecting rod arrangement in the guide elements.

According to a fundamental concept of this invention, the locking device performs its action between the at least one auxiliary door and the switching cabinet body. The locking device is unlocked by sliding the connecting rod arrangement in the unlocking direction.

According to one embodiment, an essentially U-shaped angled element can be mounted to the inside surface of the at least one auxiliary door and a hook element, which is supported on the upper horizontal frame profile of the switching cabinet so that it can pivot around a horizontal pivot axis, and can be brought into engagement with the angled element by the force of gravity or by the force of a spring, which locks the auxiliary door.

In order to then unlock the auxiliary door by sliding the connecting rod arrangement in the unlocking direction, the connecting rod arrangement can be guided below and perpendicular to the hook element. A stop element, which has an inclined flank oriented toward the hook element, is situated on the connecting rod arrangement. When the connecting rod arrangement is slid in the unlocking direction, the inclined flank of the stop element lifts the hook element, causing the hook element to disengage from the U-shaped angled element, which unlocks the auxiliary door.

On the main door and the at least one auxiliary door, a respective door lock can be provided, which can be actuated by a door handle mounted on the respective outside surface of the door, permitting the respective door to be opened in the unlocked state.

An outside surface can have a main switch that is connected to the power supply by an electronic circuit and that is coupled to the door lock of the main door. Manual actuation of the main switch can interrupt the supply of current and unlock the main door.

The switching cabinet arrangement can have a switching cabinet with a framework to which the main door and the at least one auxiliary door are hinged or can have several switching cabinets arranged in sequence, each with a separate framework.

BRIEF DESCRIPTION OF THE DRAWINGS

This invention is explained in greater detail below in view of a preferred embodiment, with reference to the accompanying drawings, wherein:

FIG. 3 is a schematic, partially cut-away front view of the latching device shown in FIG. 2, in the locked position;

FIG. 4 is a schematic, partially cut-away side view of the latching device shown in FIGS. 2 and 3, in the locked position;

DETAILED DESCRIPTION OF THE INVENTION

Figure 1:
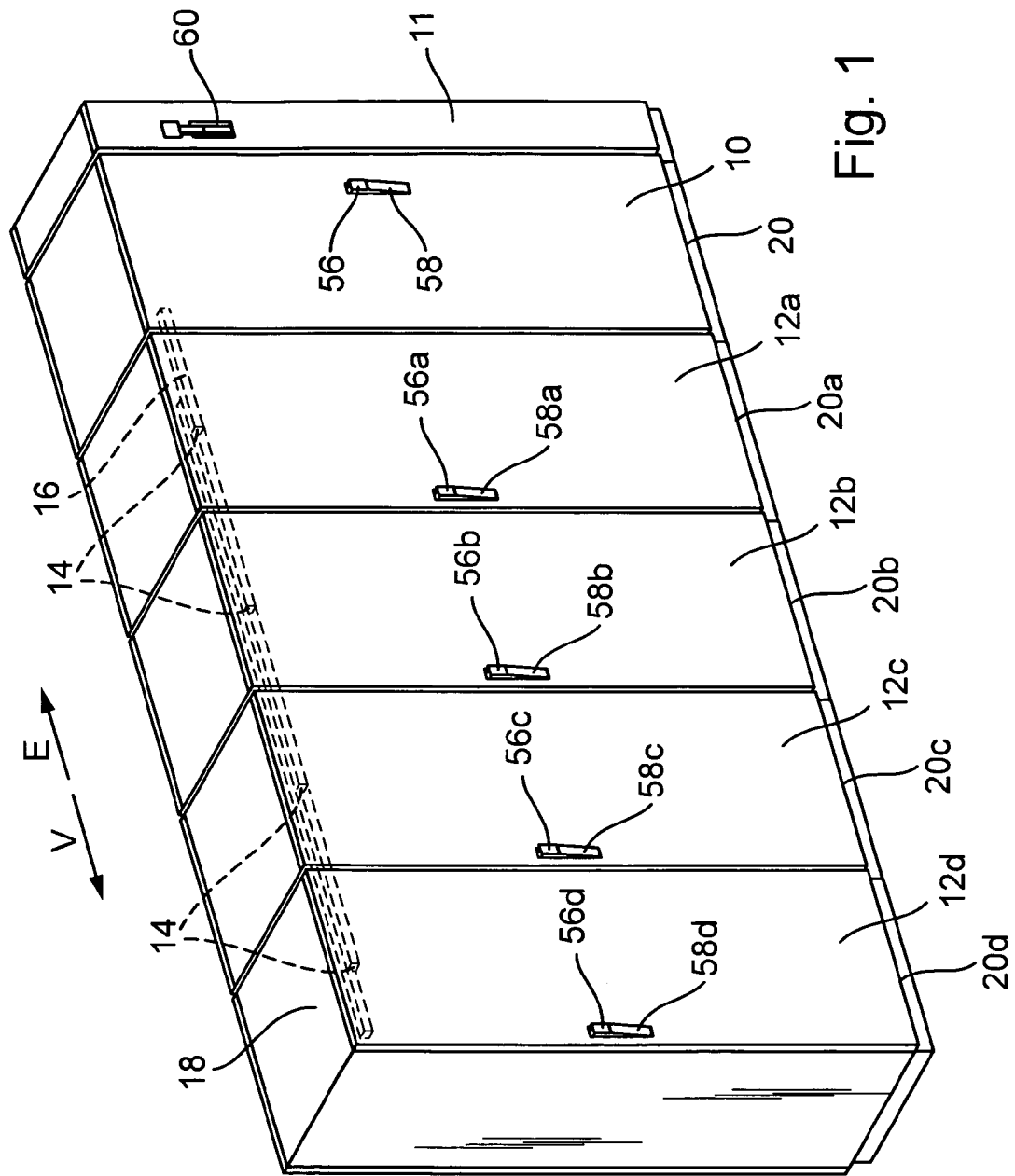
FIG. 1 is a schematic, perspective view of a switching cabinet arrangement with a main door and four auxiliary doors.

FIG. 1 is a schematically depicted, perspective view of a switching cabinet arrangement comprising a sequence of five switching cabinets 20, 20a, 20b, 20c, and 20d, each equipped with a separate framework, not shown in detail in FIG. 1. In FIG. 1, the main switching cabinet 20 is shown on the right side and adjoining it in series on the left are the auxiliary switching cabinets 20a, 20b, 20c, and 20d. Alternatively, the sequence of the main cabinet and the auxiliary doors can also be a mirror image of this arrangement.

The switching cabinets 20, 20a, 20b, 20c, and 20d are attached to one another and form a common interior in which electronic devices are accommodated.

On the main switching cabinet 20, the main door 10 is hinged to the framework, with the hinge side embodied on the left as shown in FIG. 1. The auxiliary doors 12a, 12b, 12c, and 12d are hinged to the framework of the respective auxiliary switching cabinets 20a, 20b, 20c, and 20d that are situated to the left of the main switching cabinet 20, each with the hinge side embodied on the right.

In an alternative embodiment, not shown, the switching cabinet arrangement can of a single switching cabinet with a framework on which the main door and the auxiliary doors are situated.

On the auxiliary doors 12a, 12b, 12c, 12d in the region of the upper horizontal frame profile 18 of the switching cabinet framework, a respective locking device 14 is provided and by an actuating mechanism, not shown in greater detail in FIG. 1, unlocks the auxiliary doors 12a, 12b, 12c, and 12d when the main door 10 is opened. The locking device 14 performs its action between each auxiliary door 12a, 12b, 12c, and 12d and the switching cabinet body defined by the switching cabinet framework. The locking device 14 is unlocked by a sliding of a connecting rod 16, which is horizontally guided in the region of the upper horizontal frame profile 18 and extends from the main door 10 to the auxiliary doors 12a, 12b, 12c, and 12d. When the connecting rod 16 is slid in the locking direction according to arrow V, the auxiliary doors 12a, 12b, 12c, and 12d are locked, and when it is slid in the opposite direction according to arrow E, the auxiliary doors 12a, 12b, 12c, and 12d are unlocked.

The locking devices 14 each have a respective blocking mechanism, which when the auxiliary door 12a, 12b, 12c, and 12d is open, prevents the connecting rod 16 from sliding and therefore prevents the main door 10 from closing. This blocking mechanism is described in greater detail in conjunction with FIGS. 9 through 11.

In FIG. 1, a covering plate 11 is situated or positioned to the right of and next to the main door 11. A main switch 60 is situated on its front surface.

The main switch 60 is connected by an electronic circuit to the power supply of electronic devices accommodated in the switching cabinets 20, 20a, 20b, 20c, and 20d. Through manual actuation of the main switch 60, it is possible to interrupt the current supply in order, for example, to be able to safely carry out work inside the switching cabinets 20, 20a, 20b, 20c, and 20d.

In addition, the main switch 60 is mechanically coupled to a locking device, not shown, for the main door 10. The main door 10 can be unlocked by manually actuating the main switch 60.

The main door 10 and the auxiliary doors 12a, 12b, 12c, and 12d each has a door lock 56; 56a, 56b, 56c, and 56d that serves to lock the doors. Door handles 58; 58a, 58b, 58c, and 58d that each cooperate with respective door locks 56; 56a, 56b, 56c, and 56d are mounted on the outside surfaces of the main door 10 and the auxiliary doors 12a, 12b, 12c, and 12d and can be manually actuated in order to open the respective door in the unlocked state.

FIGS. 2 through 6 schematically depict a latching device 13, which is situated on the auxiliary door 12a and is provided for locking the auxiliary door 12a. Each of the auxiliary doors 12a, 12b, 12c, and 12d is associated with a latching device 13 of this kind and the description for the arrangement on the auxiliary door 12a therefore also correspondingly applies to the remaining auxiliary doors 12b, 12c, and 12d.

Figure 2:
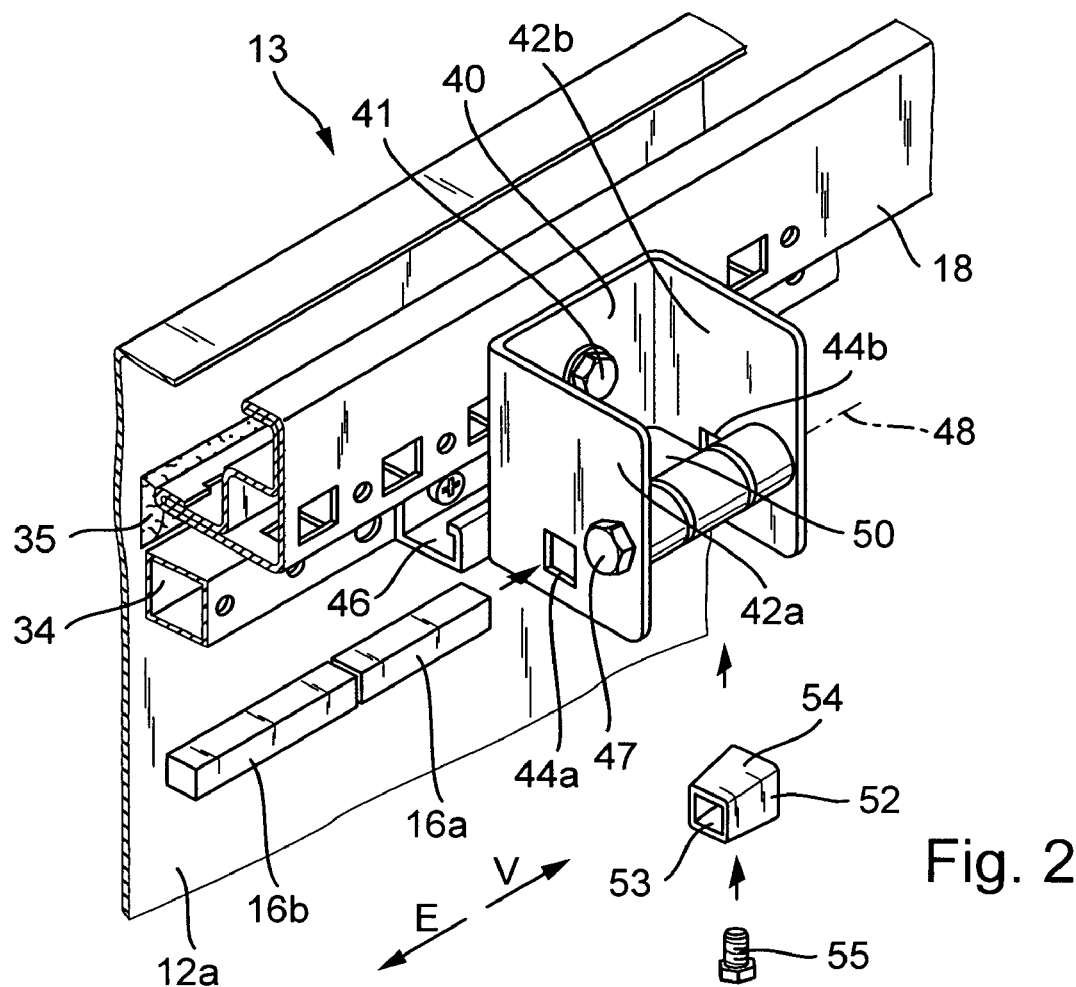
FIG. 2 is a schematic, perspective partial view of a latching device, which is situated on the auxiliary doors and is for locking the auxiliary door, shown in a partially assembled state.
Figure 5:
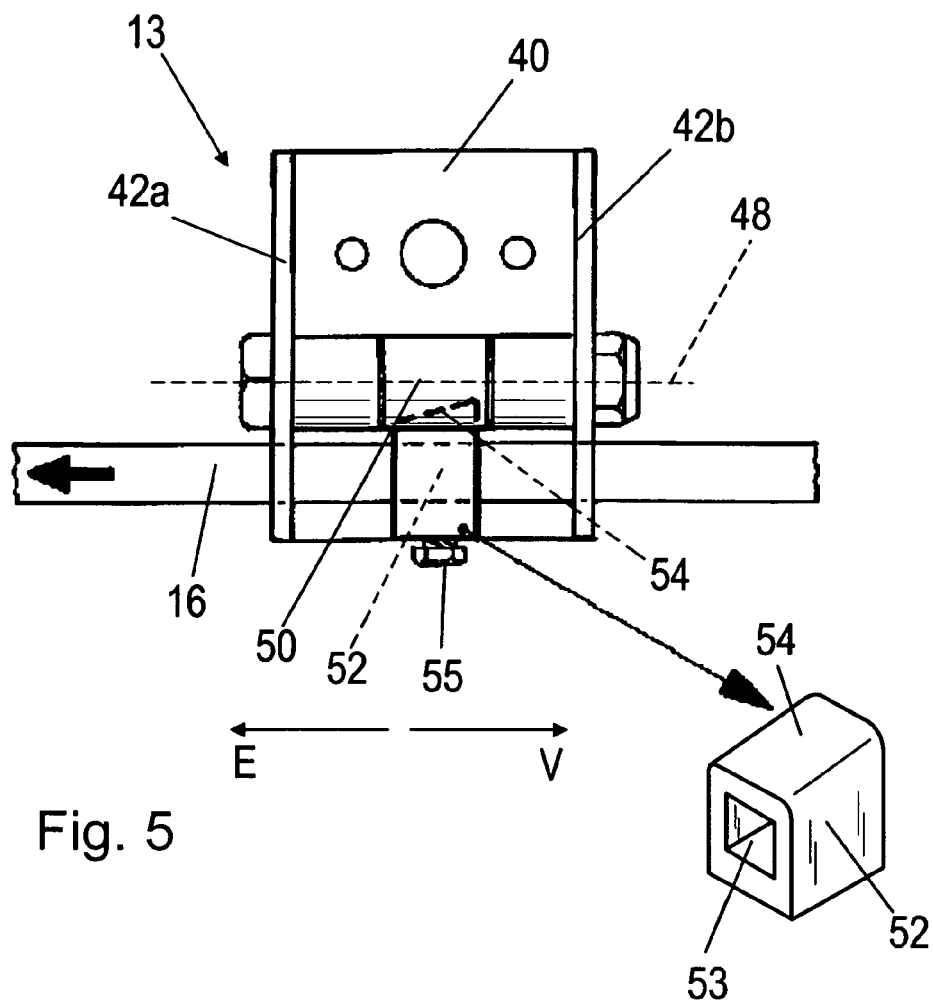
FIG. 5 is a schematic, partially cut-away front view of the latching device shown in FIG. 2, in the unlocked position.
Figure 6:
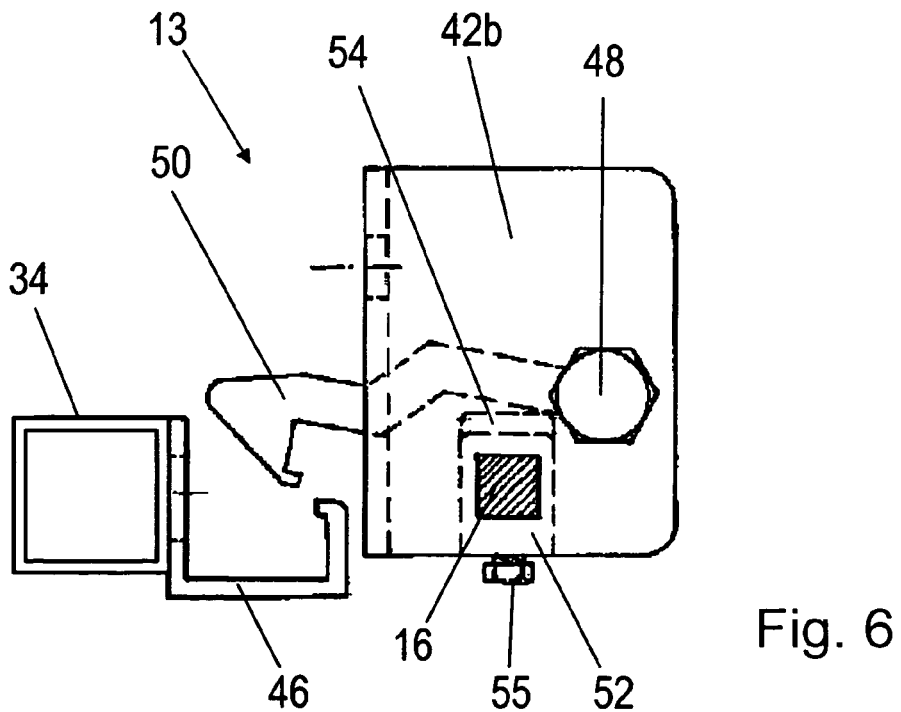
FIG. 6 is a schematic, partially cut-away side view of the latching device shown in FIGS. 2 and 3, in the unlocked position.

FIG. 2 shows the latching device 13 in a perspective partial view, looking toward the inside surface of the auxiliary door 12a when it is closed, FIG. 3 shows it in a partially cut-away front view in the locked position, FIG. 4 shows it in a partially cut-away side view in the locked position, FIG. 5 shows it in a partially cut-away front view in the unlocked position, and FIG. 6 shows it in a partially cut-away side view in the unlocked position.

A plurality of connecting rod elements, of which the connecting rod elements 16a and 16b are shown by way of example in FIG. 2, are situated or positioned in sequence to form a connecting rod arrangement and together form a connecting rod. In the text that follows, the term "connecting rod" is also used for a connecting rod arrangement. As shown in FIG. 2, the connecting rod 16a, 16b extends from the main door 10 to the auxiliary doors 12a, 12b, 12c, and 12d on the side of the auxiliary switching cabinets 20a, 20b, 20c, 20d oriented toward the door. In the region of or near the covering frame or the upper horizontal frame profile 18, and is horizontally guided there. The connecting rod 16a, 16b is slid in the unlocking direction according to arrow E as the main door 10 is opened and is slid in the locking direction according to arrow V as the main door 10 is closed.

The connecting rod 16a, 16b is guided in a guide element 40 embodied in the form of a U-shaped angled profile attached by a screw 41 to the upper horizontal frame profile 18 of the auxiliary switching cabinet 20a. When the door is closed, the upper horizontal frame profile 18 of the auxiliary switching cabinet 20a comes to rest against a circumferential seal 35 mounted on the inside surface of the auxiliary door 12a. The legs 42a and 42b of the U-shaped guide element 40 protrude perpendicular to the upper horizontal frame profile 18. Guide openings 44a and 44b lead into the legs 42a and 42b of the guide element 40 and accommodate the connecting rod 16a, 16b. The connecting rod 16a, 16b has a square cross section. The guide openings 44a and 44b have a corresponding square cross section so that the connecting rod 16a, 16b cannot be rotated in the guide openings 44a and 44b.

Between the legs 42a and 42b of the U-shaped guide element 40, a screw 47 establishes a horizontal pivot axis 48 extending parallel to the connecting rod 16a, 16b. As shown in FIGS. 4 and 6, a hook element 50 with a hook end pointing downward is supported in pivoting fashion on the pivot axis 48.

The tubular door frame 34 extending around the inner surface of the auxiliary door 12a has a U-shaped angled element 46 attached to it, opening toward the top, in which the hook element 50 engages in a gravity-induced way.

FIGS. 3 and 4 show the state in which the hook element 50 engages in the U-shaped angled element 46 and locks the auxiliary door 12a.

Below the hook element 50, perpendicular to it and spaced apart from it by a slight distance, the connecting rod 16, 16a, 16b is guided in the guide openings 44a and 44b of the U-shaped guide element 40. A stop element 52 with a square through opening 53 is slid onto the connecting rod 16, 16a, 16b and is firmly clamped in position by a screw 55 that is screwed into the stop element 52 from beneath. The stop element 52 has an inclined flank 54 oriented toward the hook element 50 so that when the connecting rod 16, 16a, 16b is slid in the unlocking direction E, the inclined flank 54 of the stop element 52 clamped to the connecting rod 16, 16a, 16b raises the hook element 50, causing the hook element 50 to disengage from the U-shaped angled element 46, thus unlocking the auxiliary door 12a, 12b, 12c, 12d.

FIGS. 5 and 6 show the state in which the hook element 50 is disengaged from the U-shaped angled element 46 and unlocked the auxiliary door 12a.

Figure 7:
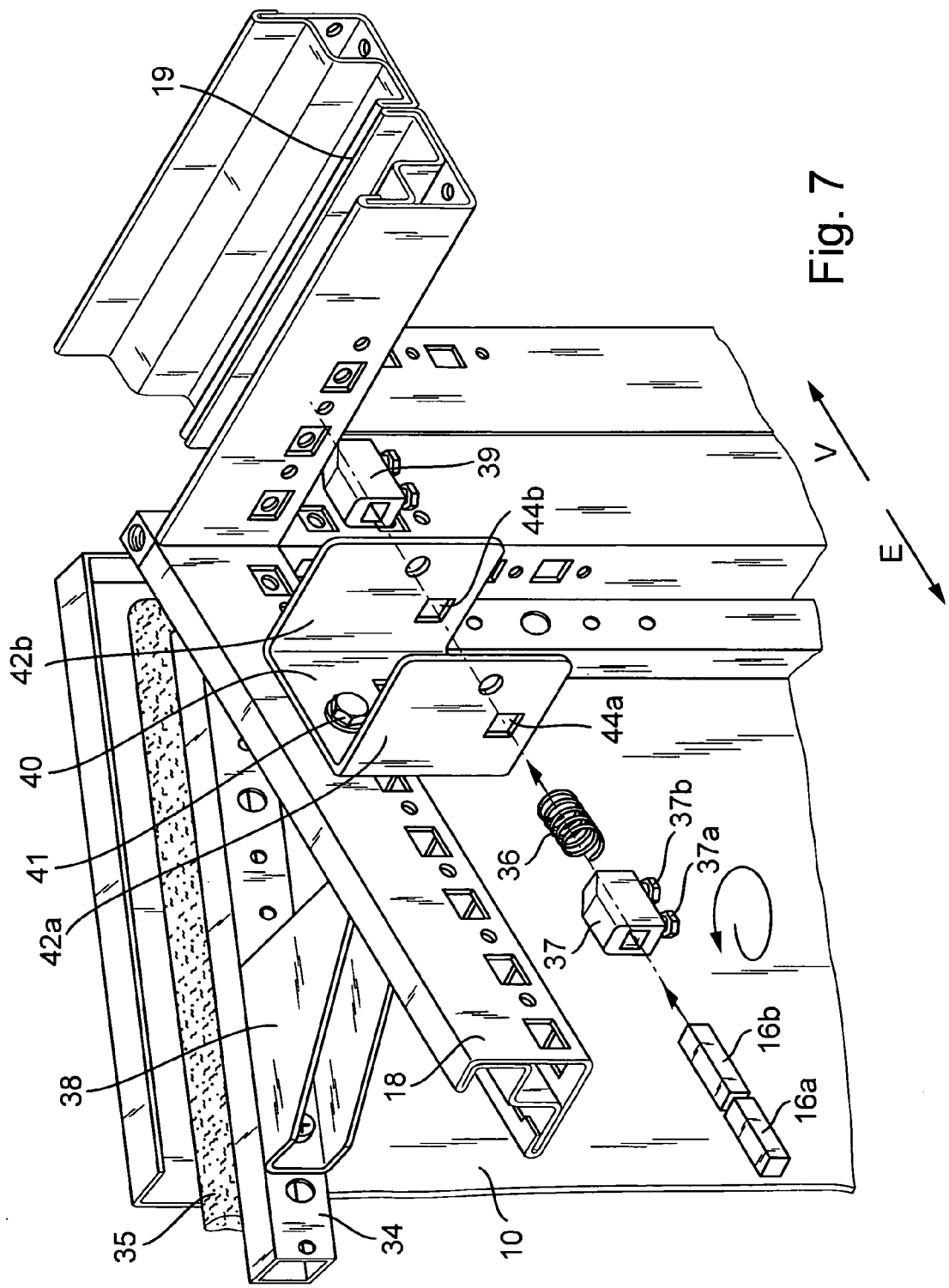
FIG. 7 is a schematic, perspective partial view of the actuating device situated on the main door for sliding the connecting rod, shown in a partially assembled state.
Figure 8:
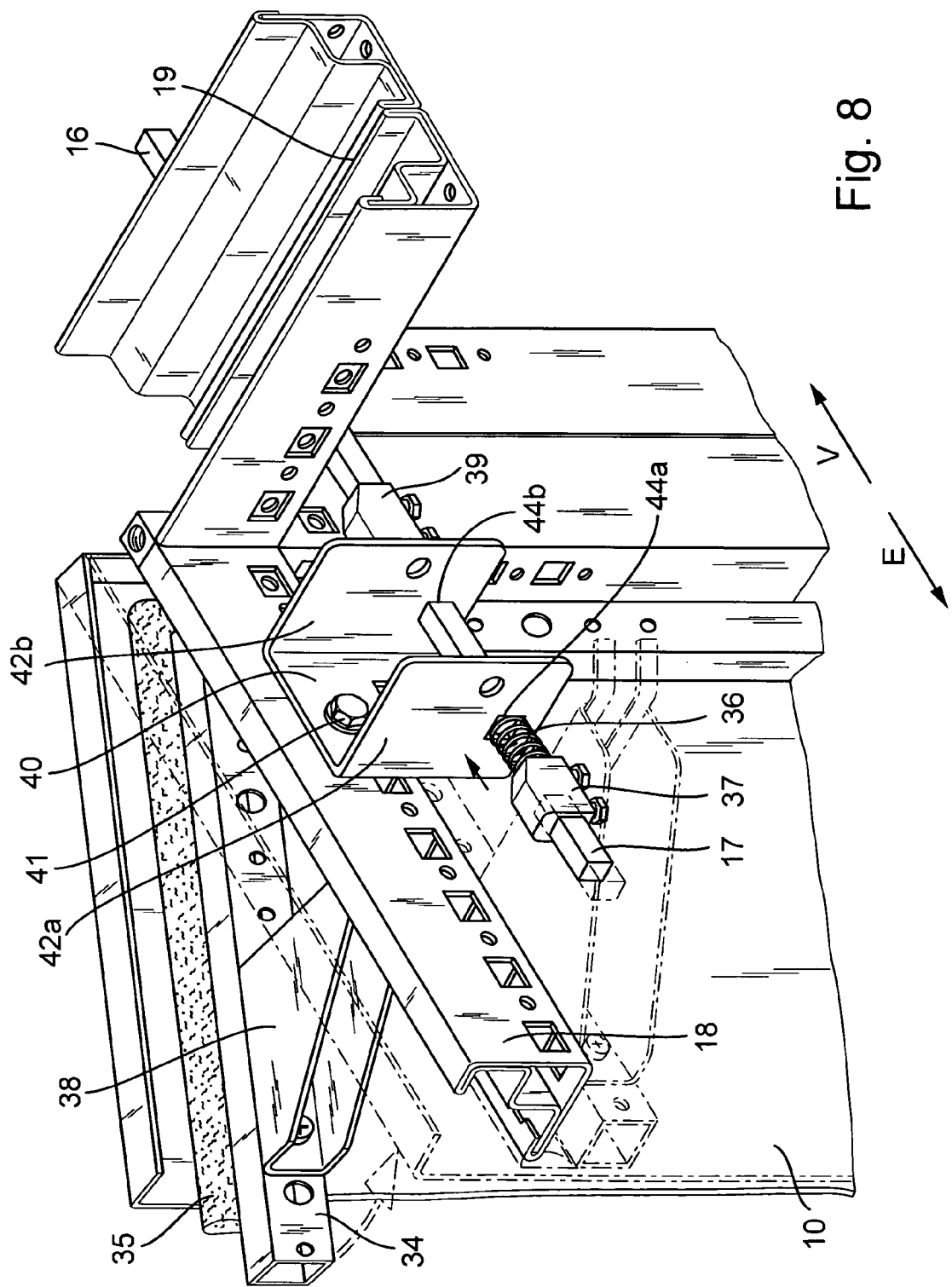
FIG. 8 is a schematic, perspective partial view of the actuating device shown in FIG. 7, in the assembled state and in two pivot positions of the main door.

FIGS. 7 and 8 show the main door 10, viewed from the interior of the switching cabinet, in the open position, depicting the upper corner region of the hinge side of the main door 10 embodied on the left as shown in FIG. 1.

FIG. 8 also shows the main door 10 in the closed position. Perpendicular to the upper horizontal frame profile 18, the drawing shows the upper frame profile 19 extending in the depth direction of the framework of the main switching cabinet 10.

Figure 9:
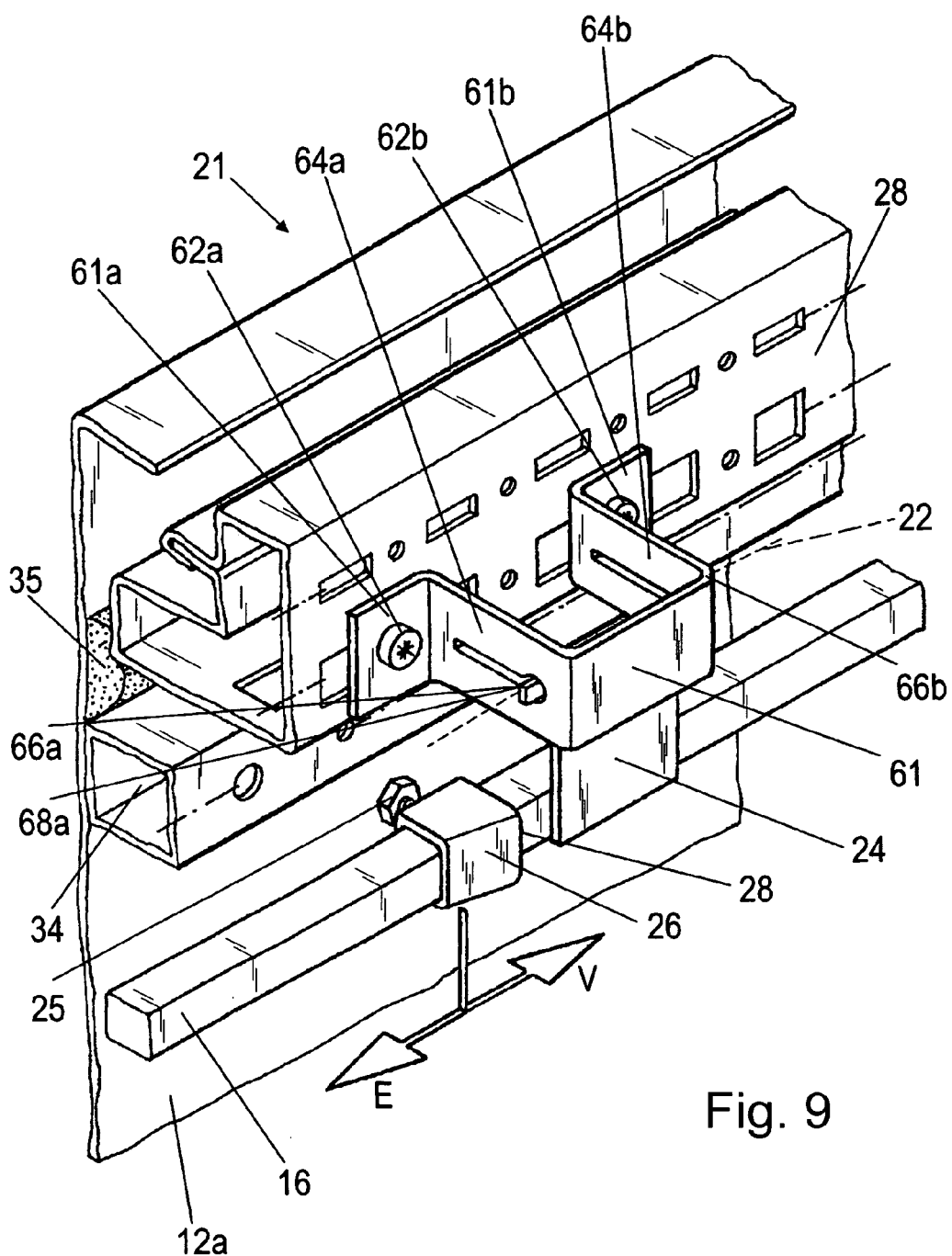
FIG. 9 is a schematic, perspective partial view of a blocking device, which is situated on the auxiliary doors and prevents the sliding of the connecting rod.

FIG. 9 also shows the main door 10 in the closed position. Perpendicular to the upper horizontal frame profile 18, the drawing shows the upper frame profile 19 extending in the depth direction of the framework of the main switching cabinet 10.

The connecting rod 16a, 16b is guided in a guide element 40 embodied in the form of a U-shaped angled profile, which is mounted by a screw 41 to the upper horizontal frame profile 18 of the main switching cabinet 20. When the door is closed, not shown, the upper horizontal frame profile 18 of the main switching cabinet 20 comes to rest against a circumferential seal 35 mounted on the inside surface of the main door 10. The legs 42a and 42b of the U-shaped guide element 40 protrude perpendicular to the upper horizontal frame profile 18. Guide openings 44a and 44b that accommodate the connecting rod 16a, 16b are lead into the legs 42a and 42b of the guide element 40. The connecting rod 16a, 16b has a square cross section. The guide openings 44a and 44b have a corresponding square cross section.

A spring element 36 prestresses the connecting rod 16, 16a, 16b in the unlocking direction E in relation to the leg 42a of the U-shaped guide element 40 affixed in stationary fashion to the upper horizontal frame profile 18 of the main switching cabinet 20. For this purpose, the spring element 36 is situated or positioned between the outside of the leg 42a of the U-shaped guide element 40 and a stop element 37, which is slid onto the connecting rod 16a, 16b and firmly clamped in position by two clamping screws 37a and 37b. This simultaneously limits the sliding movement of the connecting rod 16, 16a, 16b in the locking direction according to arrow V.

On the outside of the other leg 44b of the U-shaped guide element 40, another stop element 39 is firmly clamped in position on the connecting rod 16, 16a, 16b in order to limit the sliding movement of the connecting rod 16, 16a, 16b in the unlocking direction according to arrow E.

The free end 17 of the connecting rod 16, 16a, 16b oriented away from the leg 42a of the U-shaped guide element 40 protrudes out from one side of the stop element 37.

The tubular door frame 34 extending around the inside of the main door 10 has an actuating part 38 attached to it, which extends toward the interior of the switching cabinet in a perpendicular fashion. As the main door 10 is closed, the actuating part 38 oriented perpendicular to the free end 17 of the connecting rod 16, 16a, 16b pushes the connecting rod 16, 16a, 16b in the locking direction according to arrow V in opposition to the spring force of the spring element 36.

As the main door 10 is opened, the actuating part 38 oriented perpendicular to the free end 17 of the connecting rod 16, 16a, 16b releases the free end 17 so that the spring force of the spring element 36 slides the connecting rod 16, 16a, 16b in the unlocking direction according to arrow E.

Figure 10:
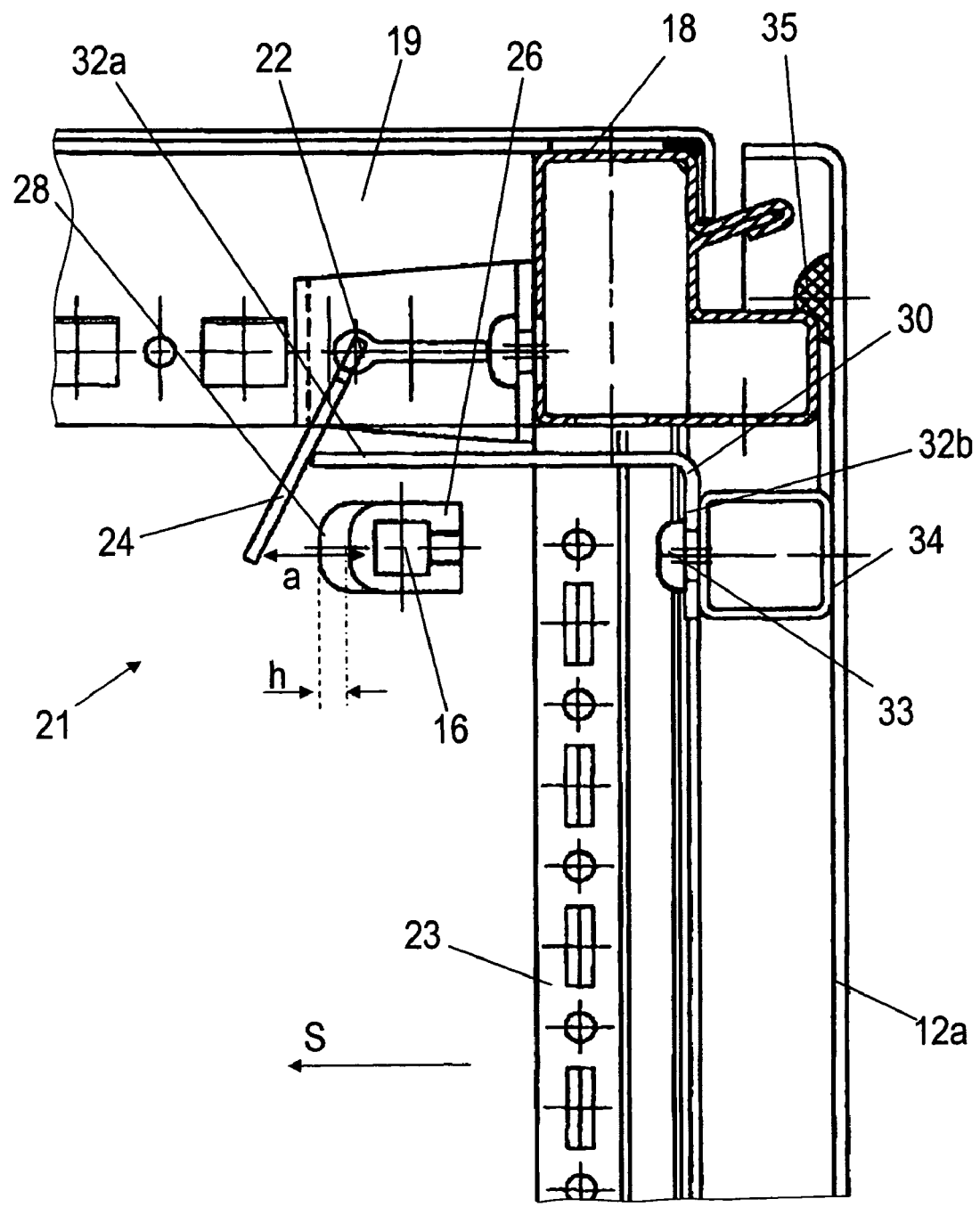
FIG. 10 is a schematic, cut away side view of the blocking device shown in FIG. 9, with a closed auxiliary door.
Figure 11:
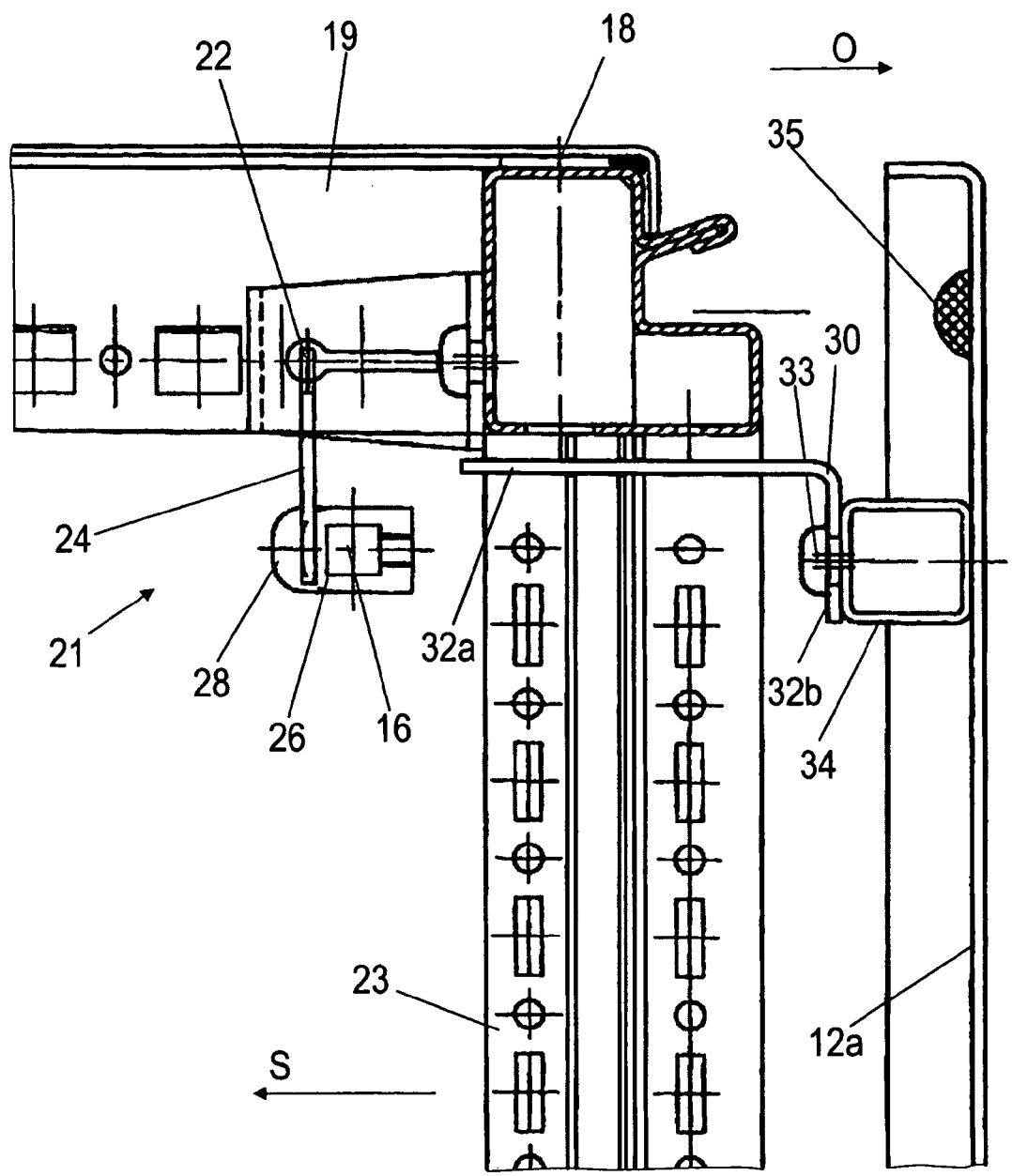
FIG. 11 is a schematic, cut-away side view of the blocking device shown in FIGS. 9 and 10, with an open auxiliary door.

FIGS. 9 through 11 schematically show the blocking device 21 that is situated on the auxiliary door 12a and is provided to prevent the connecting rod 16 from sliding in the locking direction according to arrow V. Each of the auxiliary doors 12a, 12b, 12c, and 12d is associated with such a blocking device 21. The description for the arrangement on the auxiliary door 12a therefore also correspondingly applies to the remaining auxiliary doors 12b, 12c, and 12d.

FIG. 10 shows a partially sectional side view of the blocking device 21 when the auxiliary door 12a is closed and FIG. 11 shows it when the auxiliary door 12a is open.

A guide element 61 formed as a U-shaped angled profile has angled free ends 61a and 61b that are attached to the upper horizontal frame profile 18 of the auxiliary switching cabinet 20a by two screws 62a and 62b. The legs 64a and 64b of the U-shaped guide element 40 protrude perpendicular to the upper horizontal frame profile 18.

Support openings 66a and 66b are lead into the legs 64a and 64b of the guide element 61. Between the legs 64a and 64b, an elongated blocking element 24 is supported in the support openings 66a and 66b so that it can pivot around a horizontal pivot axis 22 parallel to the connecting rod 16. The elongated locking element 24 is essentially embodied in the form of a small plate and, at the pivotably supported end, has two lugs that protrude perpendicular to the lateral edges of the blocking element 24 and define the pivot axis 22, of which only the lug labeled with the reference numeral 68a is shown in FIG. 9.

The elongated blocking element 24 supported in pivoting fashion is situated above the horizontally guided connecting rod 16 so that when the auxiliary door 12a is open, the force of gravity orients the blocking element 24 so that is spaced a slight distance apart from the connecting rod arrangement 16. In this case, the blocking element 24 hangs vertically downward. Alternatively, the blocking element could also be embodied so that it is prestressed by a spring.

Spaced a slight distance apart from the blocking element 24, a stop element 26 firmly clamps in position on the connecting rod 16 by a screw 25. The stop element 26 has a vertical flank 28 oriented toward the elongated blocking element 24. When the connecting rod 16 is slid toward the elongated blocking element 24 or more precisely, in the locking direction according to arrow V, the vertical flank 28 of the stop element 26 strikes against the opposing side surface of the blocking element 24 and thus prevents the connecting rod 16 from sliding farther.

Alternatively, the stop element 26 can also be situated on the connecting rod 16 directly next to the elongated blocking element 24.

As shown in FIGS. 10 and 11, an actuating extension 30, which protrudes into the interior of the switching cabinet perpendicular to the inner surface of the door in the direction of arrow S, is mounted to the tubular door frame 34 situated on the inner surface of the auxiliary door 12a.

The actuating extension 30 is in the form of an L-shaped angled element, one leg 32a of which is attached by a screw 33 to the tubular door frame 34 and the other leg 32b of which protrudes into the interior of the switching cabinet, perpendicular to the inner surface of the door in the direction of arrow S.

As shown in FIG. 10, when the auxiliary door 12a is closed, the leg 32b of the actuating extension 30 pushes the elongated blocking element 24 out of its vertically hanging position into a pivoted position. In the pivoted position, the blocking element 24 assumes a position spaced apart from the connecting rod 16 by a distance a, which is greater than the height h of the vertical flank 28 of the stop element 26. Since in this pivoted position, the vertical flank 28 of the stop element 26 does not strike against the opposing side surface of the blocking element 24, it is possible for the connecting rod 16 to slide in the locking direction according to arrow V. The connecting rod 16 is thus able to slide when the auxiliary door 12a is closed.

As shown in FIG. 11, when the auxiliary door 12b is open, the leg 32b of the actuating extension 30 is retracted in the opening direction according to arrow O so that the force of gravity causes the elongated blocking element 24 to assume the vertically hanging position. When the connecting rod 16 is slid toward the elongated blocking element 24 or more precisely, in the locking direction according to arrow V, the vertical flank 28 of the stop element 26 strikes against the opposing side surface of the blocking element 24 and thus prevents the connecting rod 16 from sliding when the door is open.

Because the sliding rod 16 cannot slide when the auxiliary door 12a is open, the actuating device described in conjunction with FIGS. 7 and 8, which is mounted to the main door 10 and slides the connecting rod 16 in the locking direction according to arrow V as the main door 10 is closed, prevents the main door 10 from being closed because the actuating part 38 mounted to the tubular door frame 34 of the main door 10 strikes against the free end 17 of the connecting rod 16.

Because the connector rod 16 is not able to move, the main door 10 cannot be closed. Because the main switch 60 can only be actuated when the main door 10 is closed, however, if at least one of the auxiliary doors is open, it is not possible to switch on the power supply.

Figure 12:
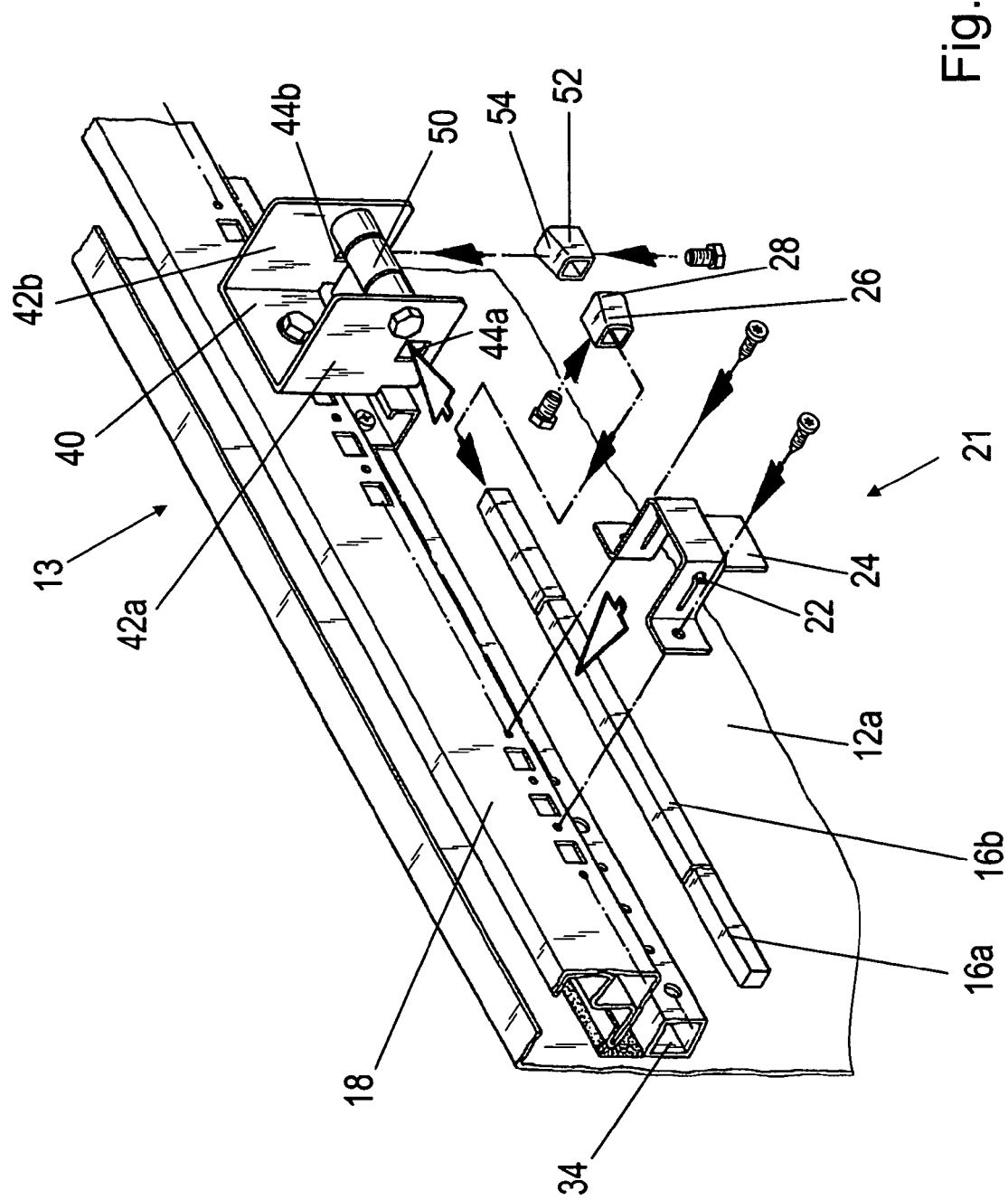
FIG. 12 is a schematic, perspective partial view of a locking device, which is situated along the connecting rod on the auxiliary doors and is of the blocking device according to FIGS. 9 through 11 and the latching device according to FIGS. 2 through 6.

FIG. 12 is a schematic, perspective, partial view of a locking device, which is situated along the connecting rod on the auxiliary doors and comprises the blocking device 21 according to FIGS. 9 through 11 and the latching device 13 according to FIGS. 2 through 6.

German Patent Reference 10 2007 051 511.3-34, the priority document corresponding to this invention, and its teachings are incorporated, by reference, into this specification.

What is claimed is:

1. A switching cabinet arrangement having a main door (10) and at least one auxiliary door (12a, 12b, 12c, 12d) having a mounted on locking device (14) and an actuating mechanism that causes an actuating device to unlock the auxiliary door (12a, 12b, 12c, 12d) as the main door (10) is opened, the switching cabinet arrangement comprising:

the locking device (14) cooperating with a blocking mechanism acting on the actuating device and preventing the main door (10) from closing when the at least one auxiliary door (12a, 12b, 12c, 12d) is open;

wherein the actuating mechanism has a connecting rod arrangement (16; 16a, 16b) horizontally guided on a side of a switching cabinet (20a, 20b, 20c, 20d) oriented toward the main door (10), near a covering frame or the upper horizontal frame profile (18), the connecting rod arrangement (16; 16a, 16b) extends from the main door (10) to the at least one auxiliary door (12a, 12b, 12c, 12d) and slidable in an unlocking direction as the main door (10) is opened and is slidable in a locking direction (V) as the main door (10) is closed; and wherein an elongated blocking element (24) is positioned near the at least one auxiliary door (12a, 12b, 12c, 12d) on the upper horizontal frame profile (18) of the switching cabinet (20a, 20b, 20c, 20d) and is supported to pivot around a horizontal pivot axis (22) extending parallel to the connecting rod arrangement (16; 16a, 16b) positioned above the horizontally guided connecting rod (16, 16a, 16b) so that when the auxiliary door (12a, 12b, 12c, 12d) is open a force of gravity or of a spring orients the blocking element (24) to be spaced a slight distance apart from the connecting rod arrangement (16; 16a, 16b), on the connecting rod arrangement (16; 16a, 16b) a stop element (26) is spaced slightly apart from the blocking element (24), the stop element (26) has a vertical flank (28) oriented toward the elongated blocking element (24) so that when the connecting rod arrangement (16: 16a, 16b) slides toward the elongated blocking element (25) or in a locking direction (V) the stop element (26) strikes against the blocking element (24) and prevents the connecting rod arrangement (16: 16a, 16b) from sliding farther.

2. The switching cabinet arrangement as recited in claim 1, wherein the connecting rod arrangement (16; 16a, 16b) comprises a continuous connecting rod (16) or several connecting rod elements (16a, 16b) arranged in sequence.

3. The switching cabinet arrangement as recited in claim 1, wherein the force of gravity or of the spring causes the blocking element (24) to contact the connecting rod arrangement (16; 16a, 16b).

4. The switching cabinet arrangement as recited in claim 3, wherein the stop element (26) is positioned on the connecting rod arrangement (16; 16a, 16b) directly next to the elongated blocking element (24), which prevents the connecting rod arrangement (16; 16a, 16b) from sliding toward the elongated blocking element (24) or in the locking direction (V).

5. The switching cabinet arrangement as recited in claim 4, wherein on an inside surface of the at least one auxiliary door (12a, 12b, 12c, 12d) an actuating extension (30) protrudes in a direction (S) perpendicular to the inside surface and into an interior of the switching cabinet and as the at least one auxiliary door (12a, 12b, 12c, 12d) is closed the elongated blocking element (24) is pushed out of a gravity-induced or spring-force induced aligned position into a pivoted position in which the blocking element (24) assumes a position spaced apart from the connecting rod arrangement (16; 16a, 16b) by a distance (a) which is greater than a height (h) of a vertical flank (28) of the stop element (26) and thus permits the connecting rod arrangement (16; 16a, 16b) to slide in the locking direction (V).

6. The switching cabinet arrangement as recited in claim 5, wherein when the auxiliary door (12a, 12b, 12c, 12d) is open, the actuating extension (30) is retracted in an opening direction (0) of the at least one auxiliary door (12a, 12b, 12c, 12d) so that the elongated blocking element (24) is aligned by the force of gravity or of the spring.

7. The switching cabinet arrangement as recited in claim 6, wherein the actuating extension (30) is formed as an L-shaped angled element having one leg (32a) mounted to the inside surface of the door and an other leg (32b) which extends in the direction (S).

8. The switching cabinet arrangement as recited in claim 7, wherein the actuating extension (30) is attached to a tubular door frame (34) extending around the inside surface of the door.

9. The switching cabinet arrangement as recited in claim 8, wherein a spring element (36) prestresses the connecting rod arrangement (16; 16a, 16b) in the unlocking direction (E) relative to a body of the switching cabinet, and an actuating part (38) attached to an inside surface of the main door (10) pushes the connecting rod arrangement (16; 16a, 16b) in the locking direction (V) in opposition to the spring force of the spring element (36) as the main door (10) is closed and releases as the main door (10) is opened so that the spring force of the spring element (36) slides the connecting rod arrangement (16; 16a, 16b) in the unlocking direction (E).

10. The switching cabinet arrangement as recited in claim 9, wherein the connecting rod arrangement (16; 16a, 16b) is guided in guide elements (40) attached to the upper horizontal frame profile (18) of the switching cabinet.

11. The switching cabinet arrangement as recited in claim 10, wherein the guide elements (40) are formed as L-shaped or U-shaped angled profiles attached to the upper horizontal frame profile (18) of the switching cabinet and legs (42a, 42b) which protrude perpendicular to the upper horizontal frame profile and have guide openings (44a, 44b) to accommodate the connecting rod arrangement (16; 16a, 16b).

12. The switching cabinet arrangement as recited in claim 11, wherein the connecting rod arrangement (16; 16a, 16b) has a rectangular cross section and the guide elements have corresponding guide openings (44a, 44b) with rectangular sections.

13. The switching cabinet arrangement as recited in claim 12, wherein the locking device (14) acts between the at least one auxiliary door (12a, 12b, 12c, 12d) and the switching cabinet body, and the locking device (14) is unlocked by sliding the connecting rod arrangement (16; 16a, 16b) in the unlocking direction (E).

14. The switching cabinet arrangement as recited in claim 13, wherein a U-shaped angled element (46) is mounted to the inside surface of the at least one auxiliary door (12a, 12b, 12c, 12d) and the force of gravity or of the spring moves a hook element (50) which is supported in a pivoting fashion on the upper horizontal frame profile (18) of the switching cabinet (20a, 20b, 20c, 20d), into engagement with the angled element (46), thus locking the auxiliary door (12a, 12b, 12c, 12d).

15. The switching cabinet arrangement as recited in claim 14, wherein the connecting rod arrangement (16; 16a, 16b) is guided below and perpendicular to the hook element (50), a stop element (52) has an inclined flank (54) oriented toward the hook element (50) and is positioned on the connecting rod arrangement (16; 16a, 16b) so that when the connecting rod arrangement (16; 16a, 16b) is slid in the unlocking direction (E) the inclined flank (54) of the stop element (52) lifts the hook element (50), thus disengaging the hook element (50) from the U-shaped angled element (46) and unlocking the auxiliary door (12a, 12b, 12c, 12d).

16. The switching cabinet arrangement as recited in claim 15, wherein on the main door (10) and the at least one auxiliary door (12a, 12b, 12c, 12d) a respective door lock (56; 56a, 56b, 56c, 56d) is actuatable by a door handle (58; 58a, 58b, 58c, 58d) mounted on a respective outside surface of a respective door so that the respective door (10; 12a, 12b, 12c, 12d) can be opened in the unlocked state.

17. The switching cabinet arrangement as recited in claim 16, wherein a main switch (60) is positioned on an outside surface and is connected to a power supply by an electronic circuit, and is coupled to the main door (10), and a manual actuation of the main switch (60) is able to interrupt a supply of current and unlock the main door (10).

18. The switching cabinet arrangement as recited in claim 17, wherein the switching cabinet arrangement has the switching cabinet with a framework to which the main door (10) and the at least one auxiliary door (12a, 12b, 12c, 12d) are hinged or has a plurality of switching cabinets (20, 20a, 20b, 20c, 20d) arranged in sequence, each with a separate framework.

19. The switching cabinet arrangement as recited in claim 1, wherein the stop element (26) is positioned on the connecting rod arrangement (16; 16a, 16b) directly next to the elongated blocking element (24), which prevents the connecting rod arrangement (16; 16a, 16b) from sliding toward the elongated blocking element (24) or in the locking direction (V).

20. The switching cabinet arrangement as recited in claim 1, wherein on an inside surface of the at least one auxiliary door (12a, 12b, 12c, 12d) an actuating extension (30) protrudes in a direction (S) perpendicular to the inside surface and into an interior of the switching cabinet and as the at least one auxiliary door (12a, 12b, 12c, 12d) is closed the elongated blocking element (24) is pushed out of a gravity-induced or spring-force induced aligned position into a pivoted position in which the blocking element (24) assumes a position spaced apart from the connecting rod arrangement (16; 16a, 16b) by a distance (a) which is greater than a height (h) of a vertical flank (28) of the stop element (26) and thus permits the connecting rod arrangement (16; 16a, 16b) to slide in the locking direction (V).

21. The switching cabinet arrangement as recited in claim 5, wherein the actuating extension (30) is formed as an L-shaped angled element having one leg (32a) mounted to the inside surface of the door and an other leg (32b) which extends in the direction (S).

22. The switching cabinet arrangement as recited in claim 5, wherein the actuating extension (30) is attached to a tubular door frame (34) extending around the inside surface of the door.

23. The switching cabinet arrangement as recited in claim 1, wherein a spring element (36) prestresses the connecting rod arrangement (16; 16a, 16b) in an unlocking direction (E) relative to a body of the switching cabinet, and an actuating part (38) attached to an inside surface of the main door (10) pushes the connecting rod arrangement (16; 16a, 16b) in the locking direction (V) in opposition to the spring force of the spring element (36) as the main door (10) is closed and releases as the main door (10) is opened so that the spring force of the spring element (36) slides the connecting rod arrangement (16; 16a, 16b) in the unlocking direction (E).

24. The switching cabinet arrangement as recited in claim 1, wherein the connecting rod arrangement (16; 16a, 16b) is guided in guide elements (40) attached to the upper horizontal frame profile (18) of the switching cabinet.

25. The switching cabinet arrangement as recited in claim 10, wherein the connecting rod arrangement (16; 16a, 16b) has a rectangular cross section and the guide elements have corresponding guide openings (44a, 44b) with rectangular sections.

26. The switching cabinet arrangement as recited in claim 1, wherein the locking device (14) acts between the at least one auxiliary door (12a, 12b, 12c, 12d) and the switching cabinet body, and the locking device (14) is unlocked by sliding the connecting rod arrangement (16; 16a, 16b) in an unlocking direction (E).

27. The switching cabinet arrangement as recited in claim 1, wherein on the main door (10) and the at least one auxiliary door (12a, 12b, 12c, 12d) a respective door lock (56; 56a, 56b, 56c, 56d) is actuatable by a door handle (58; 58a, 58b, 58c, 58d) mounted on a respective outside surface of a respective door so that the respective door (10; 12a, 12b, 12c, 12d) can be opened in the unlocked state.

28. The switching cabinet arrangement as recited in claim 1, wherein a main switch (60) is positioned on an outside surface and is connected to a power supply by an electronic circuit, and is coupled to the main door (10), and a manual actuation of the main switch (60) is able to interrupt a supply of current and unlock the main door (10).

29. The switching cabinet arrangement as recited in claim 1, wherein the switching cabinet arrangement has the switching cabinet with a framework to which the main door (10) and the at least one auxiliary door (12a, 12b, 12c, 12d) are hinged or has a plurality of switching cabinets (20, 20a, 20b, 20c, 20d) arranged in sequence, each with a separate framework.

30. A switching cabinet arrangement having a main door (10) and at least one auxiliary door (12a, 12b, 12c, 12d) having a mounted on locking device (14) and an actuating mechanism that causes an actuating device to unlock the auxiliary door (12a, 12b, 12c, 12d) as the main door (10) is opened, the switching cabinet arrangement comprising:

the locking device (14) cooperating with a blocking mechanism acting on the actuating device and preventing the main door (10) from closing when the at least one auxiliary door (12a, 12b, 12c, 12d) is open, wherein the actuating mechanism has a connecting rod arrangement (16; 16a, 16b) horizontally guided on a side of a switching cabinet (20a, 20b, 20c, 20d) oriented toward the main door (10), near a covering frame or the upper horizontal frame profile (18), the connecting rod arrangement (16: 16a, 16b) extends from the main door (10) to the at least one auxiliary door (12a, 12b, 12c, 12d) and slidable in an unlocking direction as the main door (10) is opened and is slidable in a locking direction (V) as the main door (10) is closed; and wherein a U-shaped angled element (46) is mounted to the inside surface of the at least one auxiliary door (12a, 12b, 12c, 12d) and the force of gravity or of the spring moves a hook element (50) which is supported in a pivoting fashion on the upper horizontal frame profile (18) of the switching cabinet (20a, 20b, 20c, 20d), into engagement with the angled element (46), thus locking the auxiliary door (12a, 12b, 12c, 12d).

* * * * *